(12) United States Patent
Bowman et al.

(10) Patent No.: US 8,265,863 B2
(45) Date of Patent: Sep. 11, 2012

(54) REAL-TIME COLLISION AVOIDANCE FOR MAP LABELS AND SYMBOLS

(75) Inventors: Gordon Gregory Bowman, Kemptville (CA); Gerhard Dietrich Klassen, Waterloo (CA); Eric Johnson, Ottawa (CA)

(73) Assignee: Research In Motion Limited, Waterloo, Ontario (CA)

( * ) Notice: Subject to any disclaimer, the term of this patent is extended or adjusted under 35 U.S.C. 154(b) by 734 days.

(21) Appl. No.: 11/693,208

(22) Filed: Mar. 29, 2007

(65) Prior Publication Data

US 2007/0233379 A1    Oct. 4, 2007

Related U.S. Application Data

(60) Provisional application No. 60/788,434, filed on Mar. 31, 2006, provisional application No. 60/787,541, filed on Mar. 31, 2006.

(51) Int. Cl.
G01C 21/30 (2006.01)
G06F 17/10 (2006.01)

(52) U.S. Cl. .................................. 701/211; 701/301

(58) Field of Classification Search .................. 701/200, 701/206, 207, 208, 212, 213, 300, 301; 340/905, 340/988, 990, 993, 995.1, 995.11, 995.12, 340/995.14, 995.15, 995.18, 995.24, 995.27; 711/5; 715/204
See application file for complete search history.

(56) References Cited

U.S. PATENT DOCUMENTS

| 4,914,605 | A | * | 4/1990 | Loughmiller et al. | ........ 345/649 |
| 2003/0229441 | A1 | | 12/2003 | Pechatnikov | |
| 2006/0080032 | A1 | * | 4/2006 | Cooper et al. | ............... 701/208 |

OTHER PUBLICATIONS

Office Action issued on corresponding Canadian Application No. 2,582,988 dated Jun. 9, 2009.
CIPO Office Action dated Feb. 15, 2010 Received in reference to Canadian Patent Application No. 2,582,988.

* cited by examiner

*Primary Examiner* — Thomas Tarcza
*Assistant Examiner* — Nagi Murshed
(74) *Attorney, Agent, or Firm* — Gowling, Lafleur, Henderson LLP

(57) ABSTRACT

A method of displaying a map on a wireless communications device includes obtaining map data for rendering the map to be displayed on the wireless communications device, the map data including label data for rendering labels on the map. The device generates a collision-avoidance array representative of the map to be rendered for testing potential label positions prior to actually rendering the labels on the map. The collision-avoidance array is populated by provisionally designating, for each successive label to be rendered, a label space in the collision-avoidance array that corresponds to a map space that is to be occupied by the label on the map. The device then determines whether each successive label to be rendered collides in the collision-avoidance array with any previously designated label spaces. If no collision exists for a given label, the label can be rendered on the map.

9 Claims, 15 Drawing Sheets

FIG. 6A
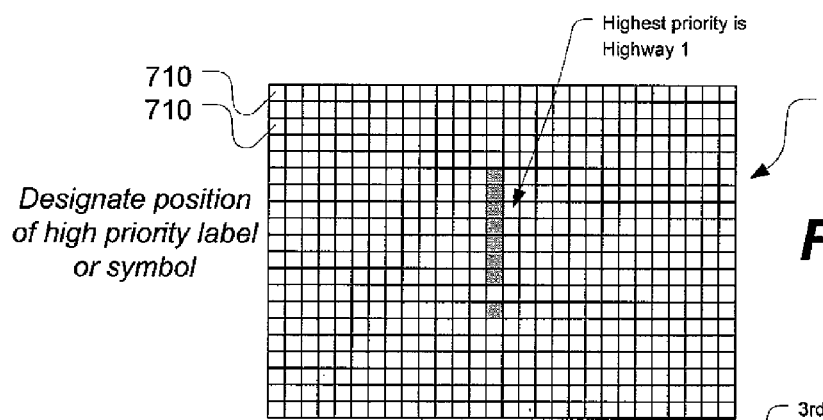
*Designate position of high priority label or symbol*
FIG. 6B
*Provisionally designate position of each successive label or symbol of decreasing priority to check for collision*
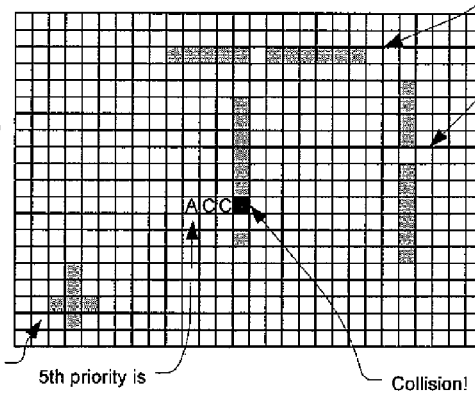
FIG. 6C

FIG. 7A
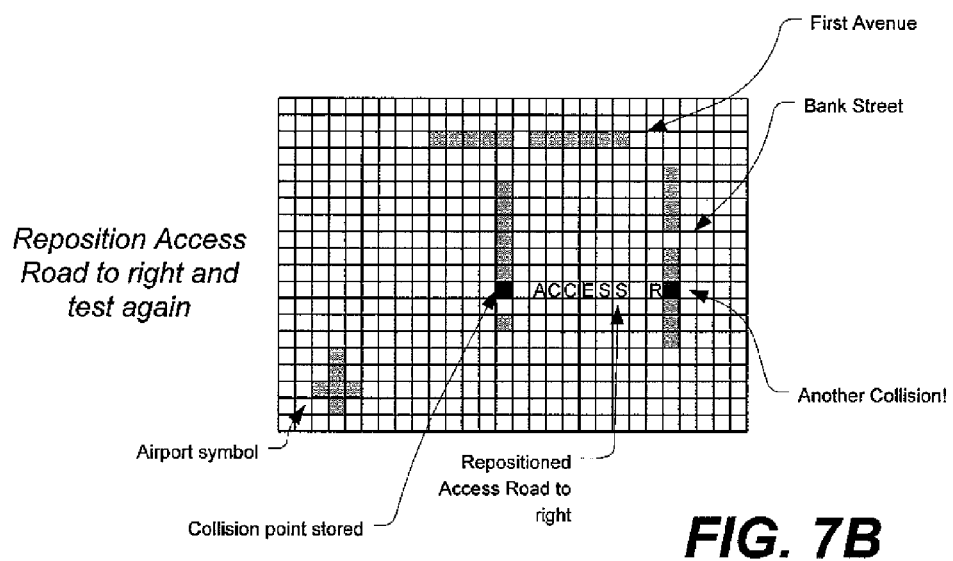
FIG. 7B

FIG. 8A
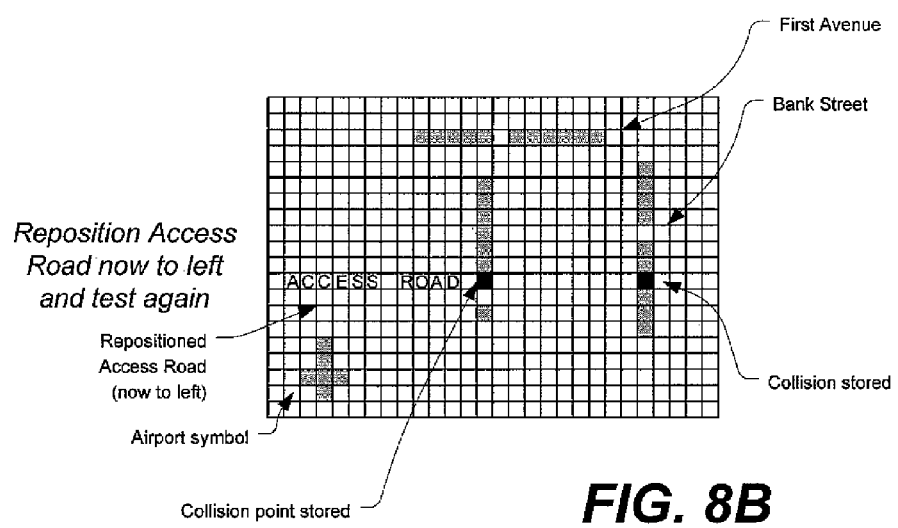
FIG. 8B

REAL-TIME COLLISION AVOIDANCE FOR MAP LABELS AND SYMBOLS

CROSS-REFERENCE TO RELATED APPLICATIONS

This application claims priority from U.S. Provisional Patent Application No. 60/788,434 entitled "Methods and Apparatus for Dynamically Labelling Map Objects in Visually Displayed Maps of Mobile Communication Devices" filed on Mar. 31, 2006 and from U.S. Provisional Patent Application No. 60/787,541 entitled "Method and System for Distribution of Map Content to Mobile Communication Devices" filed on Mar. 31, 2006.

TECHNICAL FIELD

The present disclosure relates generally to wireless communications devices and, in particular, to techniques for generating map content on wireless communications devices.

BACKGROUND

Wireless communications devices such as the BlackBerry® by Research in Motion Limited enable users to download map content from web-based data sources such as BlackBerry Maps™, Google Maps™ or Mapquest™. Downloaded map content is displayed on a small LCD display screen of the wireless communications device for viewing by the user. The user can pan up and down and side to side as well as zoom in or out. Due to the small display and limited processor on the device and due to the limited over-the-air (OTA) bandwidth, there is a need to optimize the delivery and handling of the map data.

With the increasing availability of wireless communications devices having onboard Global Positioning System (GPS) receivers for providing location-based services (LBS), the efficient delivery and handling of map data is increasingly important.

Pre-processing map data server-side to find ideal locations for labels is generally not a feasible solution for wireless communications devices because the label positions are specific to a particular zoom level. Transmitting pre-rendered bitmaps having label positions specific to each zoom level is too much of a burden on the limited over-the-air bandwidth. Even when the map data is in vector format, determining label positions server-side and then sending the coordinates to the wireless device is an unsatisfactory solution because of the resulting burden on the wireless link.

When performed on the client device, labelling map features in a computationally efficient manner on the small display screen is a challenge. Although complex algorithms can be devised to recursively test map label positions before rendering these in real-time on the map in a visually pleasing manner, the limited processing capacity make these complex algorithms generally unsuitable for use on wireless communications devices.

Accordingly, a technique for efficiently determining label positions for labels of maps displayed on wireless communications devices remains highly desirable.

BRIEF DESCRIPTION OF THE DRAWINGS

Further features and advantages of the present technology will become apparent from the following detailed description, taken in combination with the appended drawings, in which:

FIG. 6A is a depiction of a map rendered on a display where two labels overlap as a result of a very simplistic algorithm that blindly positions labels at midpoints of their associated features;

FIG. 6B is a schematic depiction of a collision-avoidance array for testing provisionally designated position to ensure that no collision occurs with any previously designated map positions;

FIG. 6C is a schematic depiction of the collision-avoidance array of FIG. 6B, illustrating the checking of provisionally designated map positions for each successive map label of decreasing priority;

FIG. 7A is a depiction of a further collision that would occur if the map label "Access Road" were relocated to the right after an initial determination that the first provisionally designated map position collided with a previously designated map position;

FIG. 7B is a schematic depiction of the collision-avoidance array used to test the relocated map position of FIG. 7A;

FIG. 8A is a depiction of an acceptable map position for the "Access Road" after relocating the label to the left;

FIG. 8B is a schematic depiction of the collision-avoidance array used to test the map position of FIG. 8A;

It will be noted that throughout the appended drawings, like features are identified by like reference numerals.

DETAILED DESCRIPTION OF THE EMBODIMENTS

Figure 1:
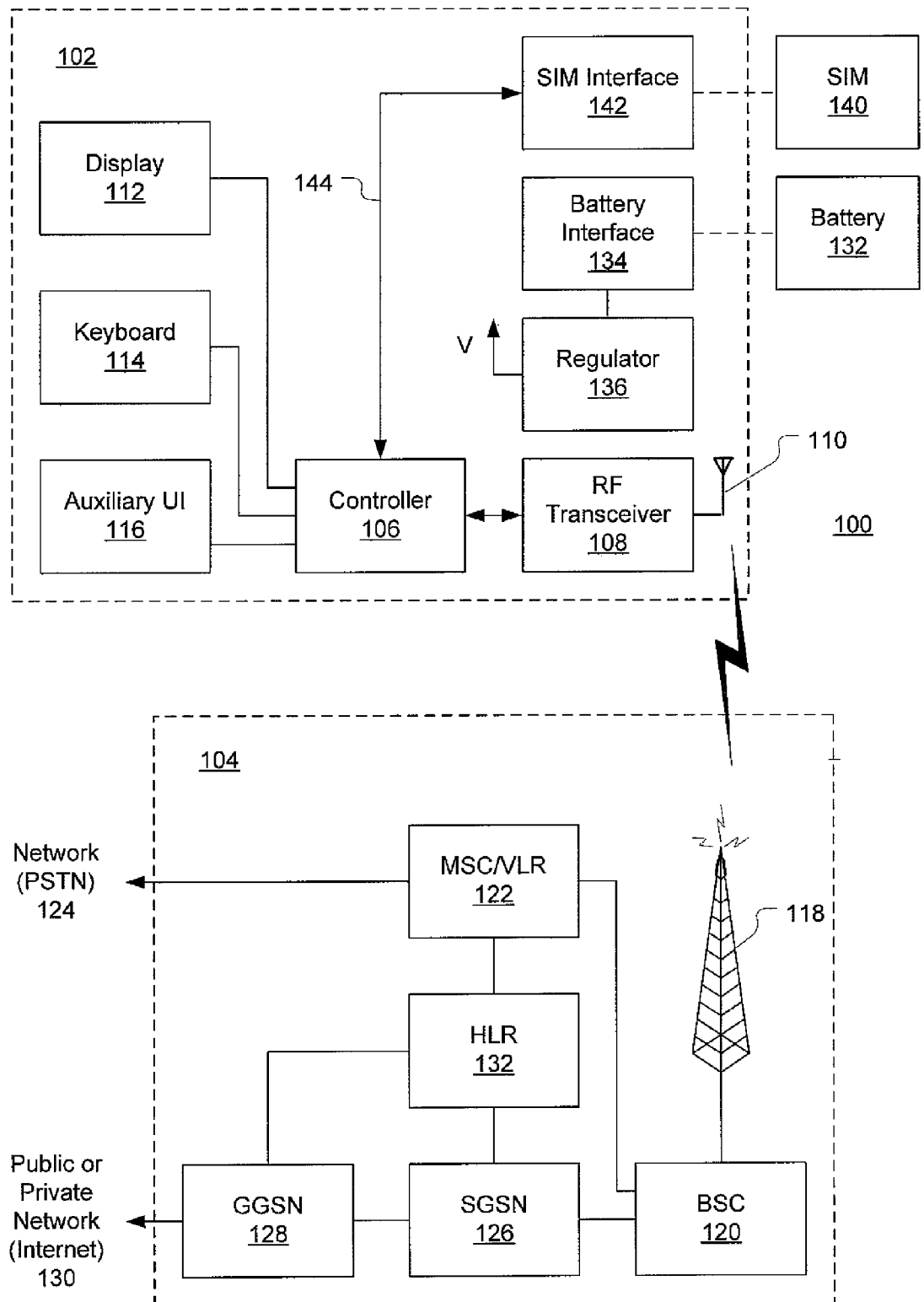
FIG. 1 is a block diagram schematically illustrating pertinent components of a wireless communications device and of a wireless communications network.

The present technology provides, in general, a method for efficiently determining label positions for labels to be rendered on a map on a display screen of a wireless communications device. Once map data and associated label data is obtained, a collision-avoidance array is generated that is representative of the map to be rendered. This enables the testing of potential label positions prior to actually rendering the labels on the map. The collision-avoidance array is populated by provisionally designating, for each successive label to be rendered, a label space in the collision-avoidance array that corresponds to a map space that is to be occupied by the label on the map. The device then determines whether each successive label to be rendered collides in the collision-avoidance array with any previously designated label spaces. If no collision exists for a given label, the label can be rendered on the map. By designating label positions for labels from highest priority to lowest, all label position assignments can be done in a single pass, i.e. without resorting to recursive algorithms that are computationally more intensive and which burden the wireless link.

Thus, an aspect of the present technology is a method of displaying a map on a wireless communications device that includes steps of obtaining map data for rendering the map to be displayed on the wireless communications device, the map data including label data for rendering labels on the map, generating a collision-avoidance array representative of the map to be rendered for testing potential label positions prior to actually rendering the labels on the map, populating the collision-avoidance array by provisionally designating, for each successive label to be rendered, a label space in the collision-avoidance array that corresponds to a map space that is to be occupied by the label on the map and by determining whether each successive label to be rendered collides in the collision-avoidance array with any previously designated label spaces, and rendering the labels on the map in the positions or "map spaces" that are determined (using the collision-avoidance array) to be free of any other labels.

Another aspect of the present technology is a computer program product that includes code adapted to perform the foregoing method steps when the computer program product is loaded into memory and executed on a processor of a wireless communications device.

Yet another aspect of the present technology is a wireless communications device for enabling a user of the device to display a map on the device. The wireless device includes an input device for enabling the user to cause the device to obtain map data for rendering the map to be displayed on a display of the device, the map data including label data for rendering labels on the map for identifying one or more map features. The wireless communications device also includes a memory for storing code to instruct a processor to generate a collision-avoidance array representative of the map to be rendered for testing potential label positions prior to actually rendering the labels on the map, populate the collision-avoidance array by provisionally designating, for each successive label to be rendered, a label space in the collision-avoidance array that corresponds to a map space that is to be occupied by the label on the map and by determining whether each successive label to be rendered collides in the collision-avoidance array with any previously designated label spaces, and render the labels on the map in the positions or "map spaces" that are determined (using the collision-avoidance array) to be free of any other labels.

The details and particulars of these aspects of the technology will now be described below, by way of example, with reference to the attached drawings.

FIG. 1 is a block diagram of a communication system 100 which includes a wireless communications device 102 (also referred to as a mobile communications device) which communications through a wireless communication network 104. For the purposes of the present specification, the expression "wireless communications device" encompasses not only a wireless handheld, cell phone or wireless-enabled laptop but also any mobile communications device or portable communications device such as a satellite phone, wireless-enabled PDA or wireless-enabled MP3 player. In other words, for the purposes of this specification, "wireless" shall be understood as encompassing not only standard cellular or microwave RF technologies, but also any other communications technique that conveys data over the air using an electromagnetic signal.

The wireless communications device 102 preferably includes a visual display 112, e.g. an LCD screen, a keyboard 114 (or keypad), and optionally one or more auxiliary user interfaces (UI) 116, each of which is coupled to a controller 106. The controller 106 is also coupled to radio frequency (RF) transceiver circuitry 108 and an antenna 110. Typically, controller 106 is embodied as a central processing unit (CPU) which runs operating system software in a memory device (described later with reference to FIG. 2). Controller 106 normally controls the overall operation of the wireless communications device 102, whereas signal processing operations associated with communications functions are typically performed in the RF transceiver circuitry 108. Controller 106 interfaces with the display screen 112 to display received information, stored information, user inputs, and the like. Keyboard/keypad 114, which may be a telephone-type keypad or a full QWERTY keyboard, is normally provided for entering commands and data.

The wireless communications device 102 sends communication signals to and receives communication signals from network 104 over a wireless link via antenna 110. RF transceiver circuitry 108 performs functions similar to those of station 118 and Base Station Controller (BSC) 120, including, for example, modulation and demodulation, encoding and decoding, and encryption and decryption. It will be apparent to those skilled in the art that the RF transceiver circuitry 108 will be adapted to the particular wireless network or networks in which the wireless communications device is intended to operate.

The wireless communications device 102 includes a battery interface 134 for receiving one or more rechargeable batteries 132. Battery 132 provides electrical power to electrical circuitry in the device 102, and battery interface 134 provides for a mechanical and electrical connection for battery 132. Battery interface 134 is couple to a regulator 136 which regulates power to the device. When the wireless device 102 is fully operationally, an RF transmitter of RF transceiver circuitry 108 is typically keyed or turned on only when it is sending to network, and is otherwise turned off to conserve resources. Similarly, an RF receiver of RF transceiver circuitry 108 is typically periodically turned off to conserve power until it is needed to receive signals or information (if at all) during designated time periods.

Wireless communications device 102 operates using a Subscriber Identity Module (SIM) 140 which is connected to or inserted in the wireless communications device 102 at a SIM interface 142. SIM 140 is one type of a conventional "smart card" used to identify an end user (or subscriber) of wireless device 102 and to personalize the device, among other things. Without SIM 140, the wireless communications device 102 is not fully operational for communication through wireless network 104. By inserting the SIM card 140 into the wireless communications device 102, an end user can have access to any and all of his subscribed services. SIM 140 generally includes a processor and memory for storing information. Since SIM 140 is coupled to SIM interface 142, it is coupled to controller 106 through communication lines 144. In order to identify the subscriber, SIM 140 contains some user parameters such as an International Mobile Subscriber Identity (IMSI). An advantage of using SIM 140 is that end users are not necessarily bound by any single physical wireless device. SIM 140 may store additional user information for the wireless device as well, including datebook (calendar) information and recent call information.

The wireless communications device 102 may consist of a single unit, such as a data communication device, a cellular telephone, a Global Positioning System (GPS) unit, a multiple-function communication device with data and voice communication capabilities, a wireless-enabled personal digital assistant (PDA), or a wireless-enabled laptop computer. Alternatively, the wireless communications device 102 may be a multiple-module unit comprising a plurality of separate components, including but in no way limited to a computer or other device connected to a wireless modem. In particular, for example, in the block diagram of FIG. 1, RF circuitry 108 and antenna 110 may be implemented as a radio modem unit that may be inserted into a port on a laptop computer. In this case, the laptop computer would include display 112, keyboard 114, one or more auxiliary UIs 116, and controller 106 embodied as the computer's CPU.

The wireless communications device 102 communicates in and through a wireless communication network 104. The wireless communication network may be a cellular telecommunications network. In the example presented in FIG. 1, wireless network 104 is configured in accordance with Global Systems for Mobile communications (GSM) and General Packet Radio Service (GPRS) technologies. Although wireless communication network 104 is described herein as a GSM/GPRS-type network, any suitable network technologies may be utilized such as Code Division Multiple Access (CDMA), Wideband CDMA (WCDMA), whether 2G, 3G, or Universal Mobile Telecommunication System (UMTS) based technologies. In this example, the GSM/GPRS wireless network 104 includes a base station controller (BSC) 120 with an associated tower station 118, a Mobile Switching Center (MSC) 122, a Home Location Register (HLR) 132, a Serving General Packet Radio Service (GPRS) Support Node (SGSN) 126, and a Gateway GPRS Support Node (GGSN) 128. MSC 122 is coupled to BSC 120 and to a landline network, such as a Public Switched Telephone Network (PSTN) 124. SGSN 126 is coupled to BSC 120 and to GGSN 128, which is, in turn, coupled to a public or private data network 130 (such as the Internet). HLR 132 is coupled to MSC 122, SGSN 126 and GGSN 128.

Tower station 118 is a fixed transceiver station. Tower station 118 and BSC 120 may be referred to as transceiver equipment. The transceiver equipment provides wireless network coverage for a particular coverage area commonly referred to as a "cell". The transceiver equipment transmits communication signals to and receives communication signals from wireless communications devices 102 within its cell via station 118. The transceiver equipment normally performs such functions as modulation and possibly encoding and/or encryption of signals to be transmitted to the wireless communications device in accordance with particular, usually predetermined, communication protocols and parameters. The transceiver equipment similar demodulates and possibly decodes and decrypts, if necessary, any communication signals received from the wireless communications device 102 transmitting within its cell. Communication protocols and parameters may vary between different networks. For example, one network may employ a different modulation scheme and operate at different frequencies than other networks.

The wireless link shown in communication system 100 of FIG. 1 represents one or more different channels, typically different radio frequency (RF) channels, and associated protocols used between wireless network 104 and wireless communications device 102. An RF channel is a limited resource that must be conserved, typically due limits in overall bandwidth and a limited battery power of the wireless device 102. Those skilled in the art will appreciate that a wireless network in actual practice may include hundreds of cells, each served by a station 118, depending upon desired overall expanse of network coverage. All pertinent components may be connected by multiple switches and routers (not shown), controlled by multiple network controllers.

For all wireless communications devices 102 registered with a network operator, permanent data (such as the user profile associated with each device) as well as temporary data (such as the current location of the device) are stored in the HLR 132. In case of a voice call to the wireless device 102, the HLR 132 is queried to determine the current location of the device 102. A Visitor Location Register (VLR) of MSC 122 is responsible for a group of location areas and stores the data of those wireless devices that are currently in its area of responsibility. This includes parts of the permanent data that have been transmitted from HLR 132 to the VLR for faster access. However, the VLR of MSC 122 may also assign and store local data, such as temporary identifications. Optionally, the VLR of MSC 122 can be enhanced for more efficient coordination of GPRS and non-GPRS services and functionality (e.g. paging for circuit-switched calls which can be performed more efficiently via SGSN 126, and combined GPRS and non-GPRS location updates).

Serving GPRS Support Node (SGSN) 126 is at the same hierarchical level as MSC 122 and keeps track of the individual locations of wireless devices 102. SGSN 126 also performs security functions and access control. Gateway GPRS Support Node (GGSN) 128 provides internetworking with external packet-switched networks and is connected with SGSNs (such as SGSN 126) via an IP-based GPRS backbone network. SGSN 126 performs authentication and cipher setting procedures based on the same algorithms, keys, and criteria as in existing GSM. In conventional operation, cell selection may be performed autonomously by wireless device 102 or by the transceiver equipment instructing the wireless device to select a particular cell. The wireless device 102 informs wireless network 104 when it reselects another cell or group of cells, known as a routing area.

In order to access GPRS services, the wireless device 102 first makes its presence known to wireless network 104 by performing what is known as a GPRS "attach". This operation establishes a logical link between the wireless device 102 and SGSN 126 and makes the wireless device 102 available to receive, for example, pages via SGSN, notifications of incoming GPRS data, or SMS messages over GPRS. In order to send and receive GPRS data, the wireless device 102 assists in activating the packet data address that it wants to use. This operation makes the wireless device 102 known to GGSN 128; internetworking with external data networks can thereafter commence. User data may be transferred transparently between the wireless device 102 and the external data networks using, for example, encapsulation and tunnelling. Data packets are equipped with GPRS-specific protocol information and transferred between wireless device 102 and GGSN 128.

Those skilled in the art will appreciate that a wireless network may be connected to other systems, possibly including other networks, not explicitly shown in FIG. 1. A network will normally be transmitting at very least some sort of paging and system information on an ongoing basis, even if there is no actual packet data exchanged. Although the network consists of many parts, these parts all work together to result in certain behaviours at the wireless link.

Figure 2:
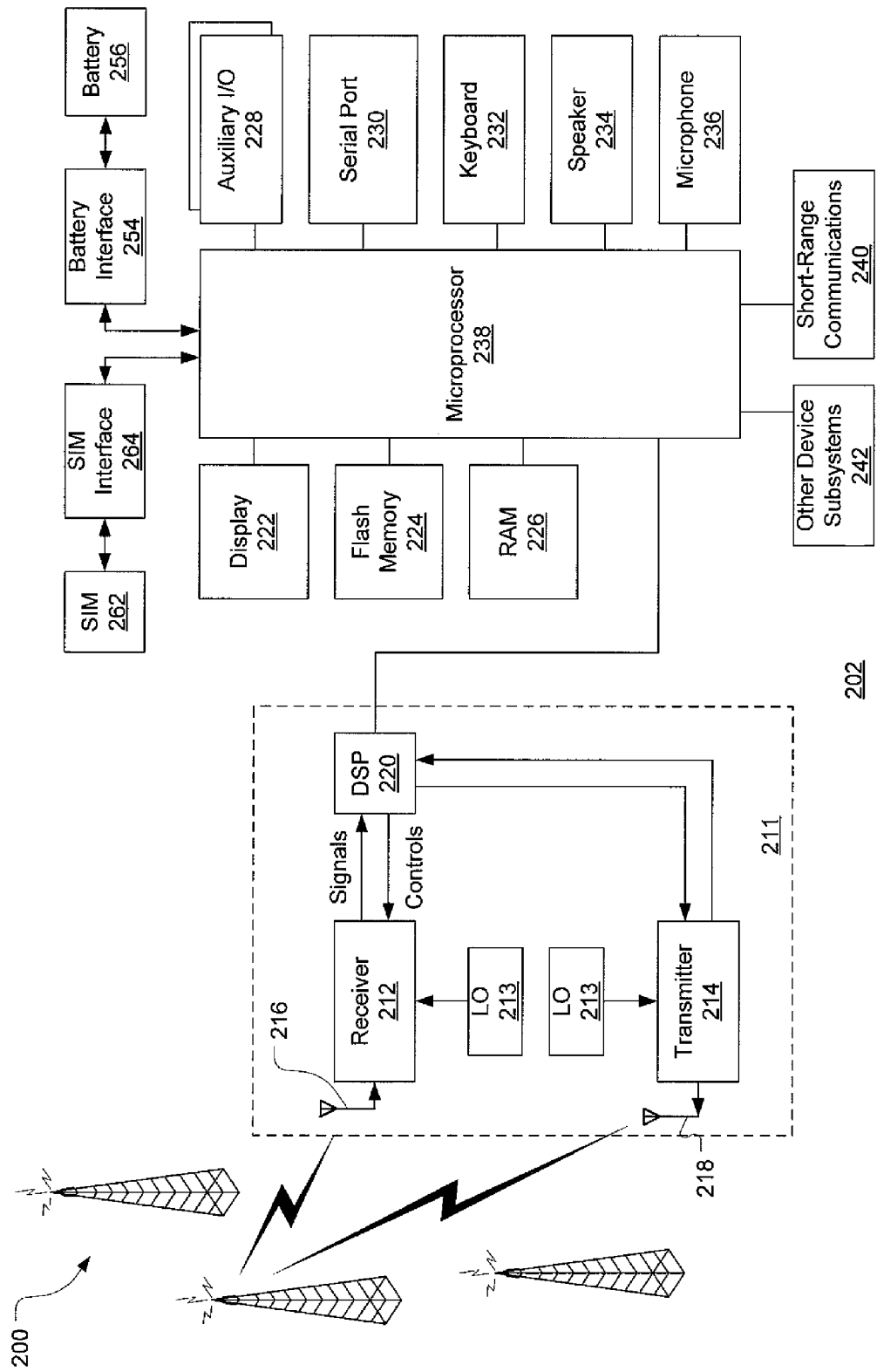
FIG. 2 is a more detailed block diagram of a wireless communications device.

FIG. 2 is a detailed block diagram of a preferred wireless communications device 202. The wireless device 202 is preferably a two-way communication device having at least voice and advanced data communication capabilities, including the capability to communicate with other computer systems. Depending on the functionality provided by the wireless device 202, it may be referred to as a data messaging device, a two-way pager, a cellular telephone with data message capabilities, a wireless Internet appliance, or a data communications device (with or without telephony capabilities). The wireless device 202 may communicate with any one of a plurality of fixed transceiver stations 200 within its geographic coverage area.

The wireless communications device 202 will normally incorporate a communication subsystem 211, which includes a receiver 212, a transmitter 214, and associated components, such as one or more (preferably embedded or internal) antenna elements 216 and 218, local oscillators (LO's) 213, and a processing module such as a digital signal processor (DSP) 220. Communication subsystem 211 is analogous to RF transceiver circuitry 108 and antenna 110 shown in FIG. 1. As will be apparent to those skilled in the field of communications, the particular design of communication subsystem 211 depends on the communication network in which the wireless device 202 is intended to operate.

The wireless device 202 may send and receive communication signals over the network after required network registration or activation procedures have been completed. Signals received by antenna 216 through the network are input to receiver 212, which may perform common receiver functions as signal amplification, frequency down conversion, filtering, channel selection, and the like, and, as shown in the example of FIG. 2, analog-to-digital (A/D) conversion. A/D conversion of a received signal allows more complex communication functions such as demodulation and decoding to be performed in the DSP 220. In a similar manner, signals to be transmitted are processed, including modulation and encoding, for example, by DSP 220. These DSP-processed signals are input to transmitter 214 for digital-to-analog (D/A) conversion, frequency up conversion, filtering, amplification and transmission over communication network via antenna 218. DSP 220 not only processes communication signals, but also provides for receiver and transmitter control. For example, the gains applied to communication signals in receiver 212 and transmitter 214 may be adaptively controlled through automatic gain control algorithms implemented in the DSP 220.

Network access is associated with a subscriber or user of the wireless device 202, and therefore the wireless device requires a Subscriber Identity Module or SIM card 262 to be inserted in a SIM interface 264 in order to operate in the network. SIM 262 includes those features described in relation to FIG. 1. Wireless device 202 is a battery-powered device so it also includes a battery interface 254 for receiving one or more rechargeable batteries 256. Such a battery 256 provides electrical power to most if not all electrical circuitry in the device 102, and battery interface provides for a mechanical and electrical connection for it. The battery interface 254 is coupled to a regulator (not shown) which provides a regulated voltage V to all of the circuitry.

Wireless communications device 202 includes a microprocessor 238 (which is one implementation of controller 106 of FIG. 1) which controls overall operation of wireless device 202. Communication functions, including at least data and voice communications, are performed through communication subsystem 211. Microprocessor 238 also interacts with additional device subsystems such as a display 222, a flash memory 224, a random access memory (RAM) 226, auxiliary input/output (I/O) subsystems 228, a serial port 230, a keyboard 232, a speaker 234, a microphone 236, a short-range communications subsystem 240, and any other device subsystems generally designated at 242. Some of the subsystems shown in FIG. 2 perform communication-related functions, whereas other subsystems may provide "resident" or onboard functions. Notably, some subsystems, such as keyboard 232 and display 222, for example, may be used for both communication-related functions, such as entering a text message for transmission over a communication network, and device-resident functions such as a calculator or task list. Operating system software used by the microprocessor 238 is preferably stored in a persistent (non-volatile) store such as flash memory 224, which may alternatively be a read-only memory (ROM) or similar storage element (not shown). Those skilled in the art will appreciate that the operating system, specific device applications, or parts thereof, may be temporarily loaded into a volatile store such as RAM 226.

Microprocessor 238, in addition to its operating system functions, enables execution of software applications on the wireless device 202. A predetermined set of applications which control basic device operations, including at least data and voice communication applications, will normally be installed on the device 202 during its manufacture. For example, the device may be pre-loaded with a personal information manager (PIM) having the ability to organize and manage data items relating to the user's profile, such as e-mail, calendar events, voice mails, appointments, and task items. Naturally, one or more memory stores are available on the device 202 and SIM 256 to facilitate storage of PIM data items and other information.

The PIM application preferably has the ability to send and receive data items via the wireless network. PIM data items may be seamlessly integrated, synchronized, and updated via the wireless network, with the wireless device user's corresponding data items stored and/or associated with a host computer system thereby creating a mirrored host computer on the wireless device 202 with respect to such items. This is especially advantageous where the host computer system is the wireless device user's office computer system. Additional applications may also be loaded into the memory store(s) of the wireless communications device 202 through the wireless network, the auxiliary I/O subsystem 228, the serial port 230, short-range communications subsystem 240, or any other suitable subsystem 242, and installed by a user in RAM 226 or preferably a non-volatile store (not shown) for execution by the microprocessor 238. Such flexibility in application installation increases the functionality of the wireless device 202 and may provide enhanced onboard functions, communication-related functions or both. For example, secure communication applications may enable electronic commerce functions and other such financial transactions to be performed using the wireless device 202.

In a data communication mode, a received signal such as a text message, an e-mail message, or a web page download will be processed by communication subsystem 211 and input to microprocessor 238. Microprocessor 238 will preferably further process the signal for output to display 222 or alternatively to auxiliary I/O device 228. A user of the wireless device 202 may also compose data items, such as email messages, for example, using keyboard 232 in conjunction with display 222 and possibly auxiliary I/O device 228. Keyboard 232 is preferably a complete alphanumeric keyboard and/or telephone-type keypad. These composed items may be transmitted over a communication network through communication subsystem 211.

For voice communications, the overall operation of the wireless communications device 202 is substantially similar, except that the received signals would be output to speaker 234 and signals for transmission would be generated by microphone 236. Alternative voice or audio I/O subsystems, such as a voice message recording subsystem, may also be implemented on the wireless device 202. Although voice or audio signal output is preferably accomplished primarily through speaker 234, display 222 may also be used to provide an indication of the identity of the calling party, duration on a voice call, or other voice call related information, as some examples.

Serial port 230 in FIG. 2 is normally implemented in a personal digital assistant (PDA)-type communication device for which synchronization with a user's desktop computer is a desirable, albeit optional, component. Serial port 230 enables a user to set preferences through an external device or software application and extends the capabilities of wireless device 202 by providing for information or software downloads to the wireless device 202 other than through the wireless network. The alternate download path may, for example, be used to load an encryption key onto the wireless device 202 through a direct and thus reliable and trusted connection to thereby provide secure device communications.

Short-range communications subsystem 240 of FIG. 2 is an additional optional component which provides for communication between mobile station 202 and different systems or devices, which need not necessarily be similar devices. For example, subsystem 240 may include an infrared device and associated circuits and components, or a Bluetooth™ communication module to provide for communication with similarly-enabled systems and devices. Bluetooth™ is a trademark of Bluetooth SIG, Inc.

Figure 3A:
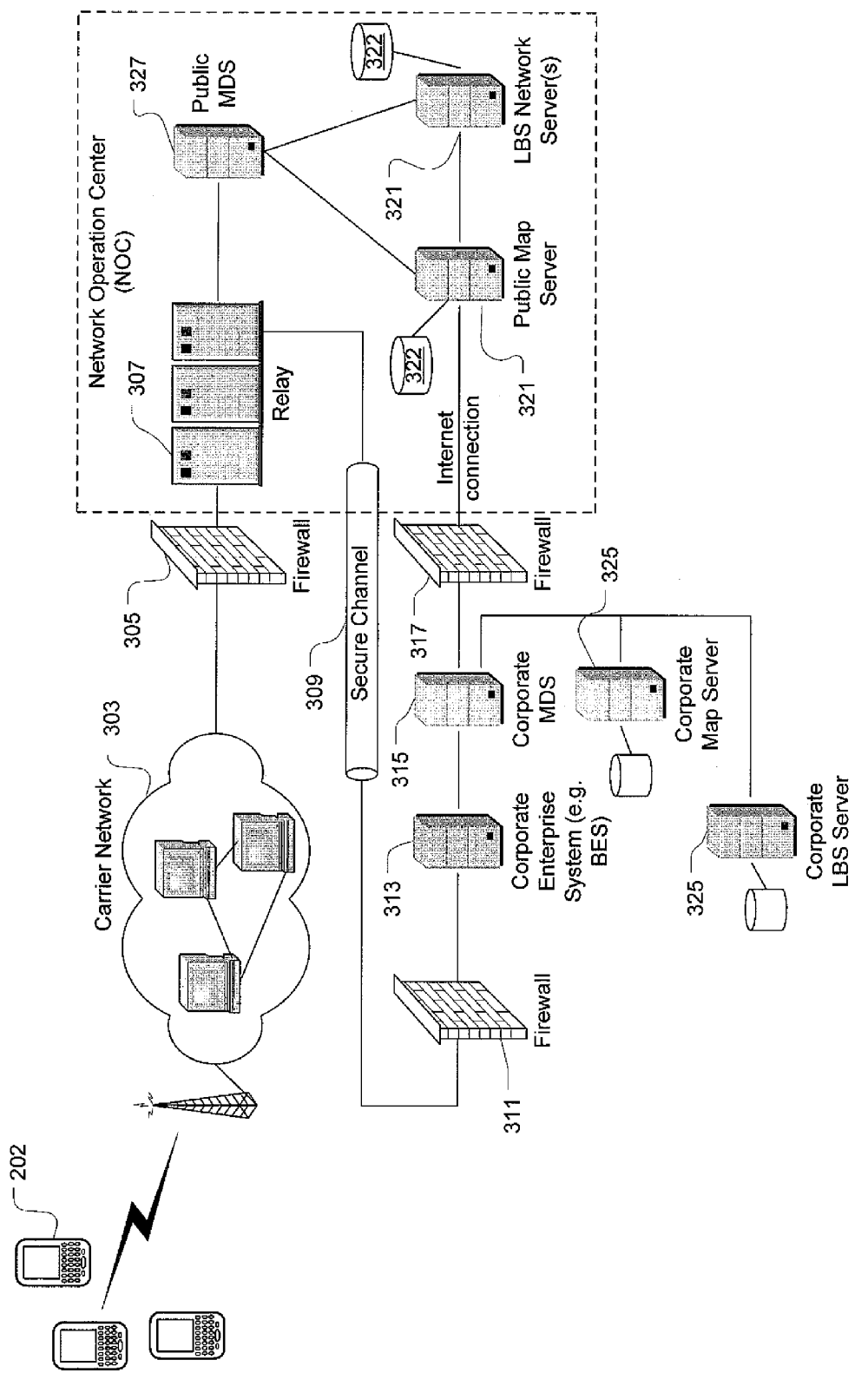
FIG. 3A is a system diagram of network components which provide mapping functionality in the wireless communications devices of FIG. 1 and FIG. 2.

FIG. 3A is a system diagram of network components which provide mapping functionality in the wireless communication devices of FIGS. 1 and 2. To achieve this, a mapping application is also provided in memory of the wireless communications device for rendering visual maps in its display. Wireless communications devices 202 are connected over a mobile carrier network 303 for communication through a firewall 305 to a relay 307. A request for map data from any one of the wireless communications devices 202 is received at relay 307 and passed via a secure channel 309 through firewall 311 to a corporate enterprise server 313 and corporate mobile data system (MDS) server 315. The request is then passed via firewall 317 to a public map server and/or to a public location-based service (LBS) server 321 which provides location-based services (LBS) to handle the request. The network may include a plurality of such map servers and/or LBS servers where requests are distributed and processed through a load distributing server. The map/LBS data may be stored on this network server 321 in a network database 322, or may be stored on a separate map server and/or LBS server (not shown). Private corporate data stored on corporate map/LBS server 325 may be added to the public data via corporate MDS server 315 on the secure return path to the wireless device 202. Alternatively, where no corporate servers are provided, the request from the wireless device 202 may be passed via relay 307 to a public MDS server 327, which sends the request to the public map/LBS server 321 providing map data or other local-based service in response to the request. For greater clarity, it should be understood that the wireless devices can obtain map data from a "pure" map server offering no location-based services, from an LBS server offering location-based services in addition to map content, or from a combination of servers offering map content and LBS.

A Maplet data structure is provided that contains all of the graphic and labelled content associated with a geographic area (e.g. map features such as restaurants (point features), streets (line features) or lakes (polygon features)). Maplets are structured in Layers of Data Entries ("DEntries") identified by a "Layer ID" to enable data from different sources to be deployed to the device and meshed for proper rendering. Each DEntry is representative of one or more artifact or label (or a combination of both) and includes coordinate information (also referred to as a "bounding box" or "bounding area") to identify the area covered by the DEntry and a plurality of data points that together represent the artefact, feature or label. For example, a DEntry may be used to represent a street on a city map (or a plurality of streets), wherein the carious points within the DEntry are separated into different parts representing various portions of the artefact or map feature (e.g. portions of the street). A wireless device may issue a request for the map server to download only those DEntries that are included within a specified area or bounding box representing an area of interest that can be represented by, for example, a pair of bottom left, top right coordinates.

Figure 3B:
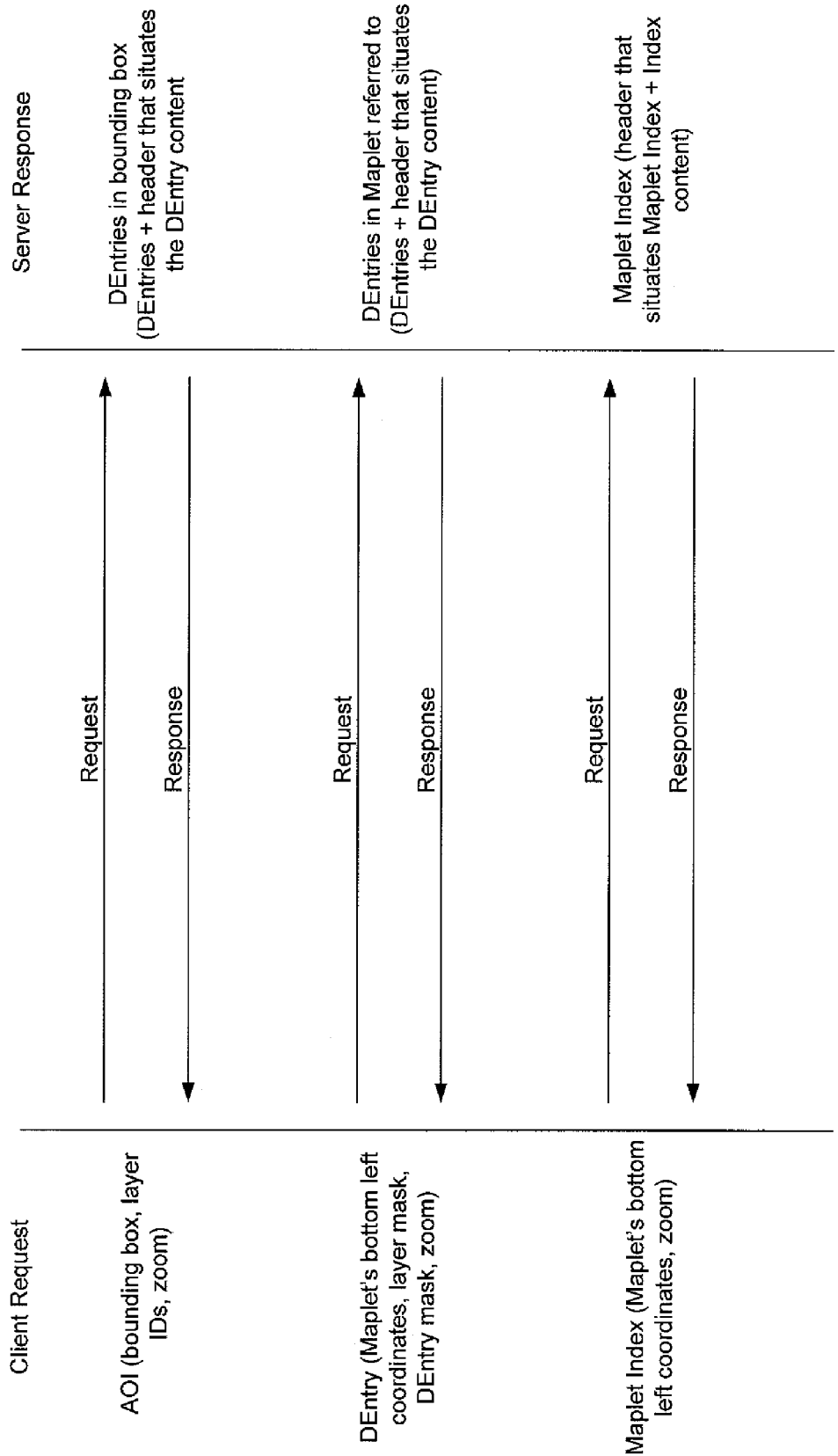
FIG. 3B illustrates a message exchange between a wireless communications device and a map server for downloading map content to the wireless communications device based on the system of FIG. 3A.

As depicted in FIG. 3B, the wireless communications device issues one or more AOI (Area of Interest) requests, DEntry or data requests and Maplet Index requests to the map server for selective downloading of map data based on user context. Thus, rather than transmitting the entire map data for an area in reply to each request from the device (which burdens the wireless link), local caching may be used in conjunction with context filtering of map data on the server. For example, if a user's wireless device is GPS enabled and the user is traveling in an automobile at 120 km/h along a freeway then context filtering can by employed to prevent downloading of map data relating to passing side streets. Or, if the user is traveling in an airplane at 30,000 feet, then context filtering can be employed to prevent downloading of map data for any streets whatsoever. Also, a user's context can be defined, for example, in terms of occupation, e.g. a user whose occupation is a transport truck driver can employ context filtering to prevent downloading of map data for side streets on which the user's truck is incapable of traveling, or a user whose occupation is to replenish supplied of soft drink dispensing machines can employ context filtering to download public map data showing the user's geographical area of responsibility with irrelevant features such as lakes and parks filtered out and private map data containing the location of soft drink dispensing machines superimposed on the public map data.

The Maplet Index request results in a Maplet Index (i.e. only a portion of the Maplet that provides a table of contents of the map data available within the Maplet rather than the entire Maplet) being downloaded from the map server to the device, thereby conserving OTA (Over-the-Air) bandwidth and device memory caching requirements. The Maplet Index conforms to the same data structure as a Maplet, but omits the data points. Consequently, the Maplet Index is small (e.g. 300-400 bytes) relative to the size of a fully populated Maplet or a conventional bit map, and includes DEntry bounding boxes and attributes (size, complexity, etc.) for all artefacts within the Maplet. As the field of view changes (e.g. for a location-aware device that displays a map while moving), the device (client) software assesses whether or not it needs to download additional data from the server. Thus, if the size attribute or complexity attribute of an artefact that has started to move into the field of view of the device (but is not yet being displayed) is not relevant to the viewer's current context, then the device can choose not to display that portion of the artifact. On the other hand, if the portion of the artefact is appropriate for display, then the device accesses its cache to determine whether the DEntries associated with that portion of the artefact have already been downloaded, in which case the cached content is displayed. Otherwise, the device issues a request for the map server to download all the of the DEntries associated with the artifact portion.

By organizing the Maplet data structure in Layers, it is possible to seamlessly combine and display information obtained from public and private databases. For example, it is possible for the device to display an office building at a certain address on a street (e.g. a $1^{st}$ z-order attribute from public database), adjacent a river (e.g. a $2^{nd}$ z-order attribute from public database), with a superimposed floor plane of the building to show individual offices (e.g. $11^{th}$ z-order attribute from a private database, accessible through a firewall).

Referring back to FIG. 3A, within the network having map server(s) and/or LBS server(s) 321 and database(s) 322 accessible to it, all of the map data for the entire world is divided and stored as a grid according to various levels of resolution (zoom), as set forth below in Table A. Thus, a single A-level Maplet represents a 0.05×0.05 degree grid area; a single B-level Maplet represents a 0.5×0.5 degree grid area; a single C-level Maplet represents a 5×5 degree grid area; a single D-level Maplet represents a 50×50 degree grid area; and a single E level Maplet represents the entire world in a single Maplet. It is understood that Table A is only an example of a particular Maplet grid division; different grid divisions having finer or coarser granularity may, of courser, be substituted. A Maplet includes a set of layers, with each layer containing a set of DEntries, and each DEntry containing a set of data points.

TABLE A

| Level | Grid (degrees) | # of Maplets to cover the World | # of Maplets to cover North America | # of Maplets to cover Europe |
|---|---|---|---|---|
| A | 0.05 × 0.05 | 25,920,000 | 356,000 | 100,000 |
| B | 0.5 × 0.5 | 259,200 | 6,500 | 1000 |
| C | 5 × 5 | 2,592 | 96 | 10 |
| D | 50 × 50 | 32 | 5 | 5 |
| E | World | 1 | 1 | 1 |

As mentioned above, three specific types of requests may be generated by a wireless communications device (i.e. the client)—AOI requests, DEntry requests and Maplet Index requests. The requests may be generated separately or in various combinations, as discussed in greater detail below. An AOI (area of interest) request calls for all DEntries in a given area (bounding box) for a predetermined or selected set of z-order Layers. The AOI request is usually generated when the device moves to a new area so as to fetch DEntries for display before the device client knows what is available in the Maplet. The Maplet Index has the exact same structure as a Maplet but does not contain complete DEntries (i.e. the data Points actually representing artifacts and labels are omitted). Thus, a Maplet Index defines what Layers and DEntries are available for a given Maplet. A data or DEntry request is a mechanism to bundle together all of the required Dentries for a given Maplet.

Typically, AOI and Maplet Index requests are paired together in the same message, although they need not be, while DEntry requests are generated most often. For example, when a wireless device moves into an area for which no information has been stored on the device client, the Maplet Index request returns a Maplet Index that indicates what data the client can specifically request from the server 321, while the AOI request returns any DEntries within the area of interest for the specified Layers (if they exist). In the example requests shown on FIG. 3B, the desired Maplet is identified within a DEntry request by specifying the bottom-left Maplet coordinate. In addition, the DEntry request may include a layer mask so that unwanted Layers are not downloaded, a DEntry mask so that unwanted data Points are not downloaded, and zoom values to specify a zoom level for the requested DEntry. Once the device client has received the requested Maplet Index, the client typically then issues multiple DEntry requests to ask for specific DEntries (since the client knows all of the specific DEntries that are available based on the Maplet Index).

In this particular implementation, a collection of 20×20 A-level Maplets (representing a 1×1 degree square) is compiled into a Maplet Block File (.mbl). An .mbl file contains a header which specifies the offset and length of each Maplet in the .mbl file. The same 20×20 collection of Maplet index data is compiled into a Maplet Index file (.mbx). The .mbl and .mbx file structures are set forth in Tables B and C, respectively.

TABLE B

| Address Offset | Offset | Length |
|---|---|---|
| 0x000 | Maplet #0 Offset (4 bytes) | Maplet #0 Length (4 bytes) |
| 0x008 | Maplet #1 Offset | Maplet #1 Length |
| 0x010 | Maplet #2 Offset | Maplet #2 Length |
| ... | ... | ... |
| 0xC78 | Maplet #399 Offset | Maplet #399 Length |
| 0xC80 | Beginning of Maplet #0 | |
| 0xC80 + Size of Maplet #0 | Beginning of Maplet #1 | |
| 0xC80 + Size of Maplet #0 + #1 | Beginning of Maplet #2 | |
| ... | ... | |
| 0xC80 + Σ of Size of Maplets (#0: #398) | Beginning of Maplet #399 | |

In Table B, the offset of Maplet #0 is 0x0000_0000 since, in this particular example, the data structure is based on the assumption that the base address for the actual Maplet data is 0x0000_0C80. Therefore the absolute address for Maplet #0 data is: Maplet #0 Address=Base Address (0x0000_0C80)+ Maplet #0 Offset (0x0000_0000), and additional Maplet addresses are calculated as: Maplet #(n+1) Offset=Maplet #(n) Offset+Maplet #(n) Length. If a Maplet has no data or does not exist, the length parameter is set to zero (0x0000_0000).

TABLE C

| Address Offset | Offset (4 bytes) | Length (4 bytes) |
|---|---|---|
| 0x000 | Maplet Index #0 Offset | Maplet Index #0 Length |
| 0x008 | Maplet Index #1 Offset | Maplet Index #1 Length |
| 0x010 | Maplet Index #2 | Maplet Index #2 |

TABLE C-continued

| Address Offset | Offset (4 bytes) | Length (4 bytes) |
|---|---|---|
| ... | Offset ... | Length ... |
| 0xC78 | Maplet Index #399 Offset | Maplet Index #399 Length |
| 0xC80 | Beginning of Maplet Index #0 | |
| 0xC80 + Size of Maplet Index #0 | Beginning of Maplet Index #1 | |
| 0xC80 + Size of Maplet Index #0 + #1 | Beginning of Maplet Index #2 | |
| ... | ... | |
| 0xC80 + Σ of Size of Maplet Indices (#0: #399) | Beginning of Maplet Index #399 | |

In Table C, the offset of Maplet Index #0 is 0x0000_0000 since, according to an exemplary embodiment the data structure is based on the assumption that the base address for the actual Maplet index data is 0x0000_0C80. Therefore, the absolute address for Maplet Index #0 data is: Maplet Index #0 Address=Base Address (0x0000_0C80)+Maplet Index #0 Offset (0x0000_0000), and additional Maplet index addresses are calculated as: Maplet Index #(n+1) Offset=Maplet Index #(n) Offset+Maplet Index #(n) Length. If a Maplet Index has no data or does not exist, the length parameter is set to zero (0x0000_0000).

Figure 3C:
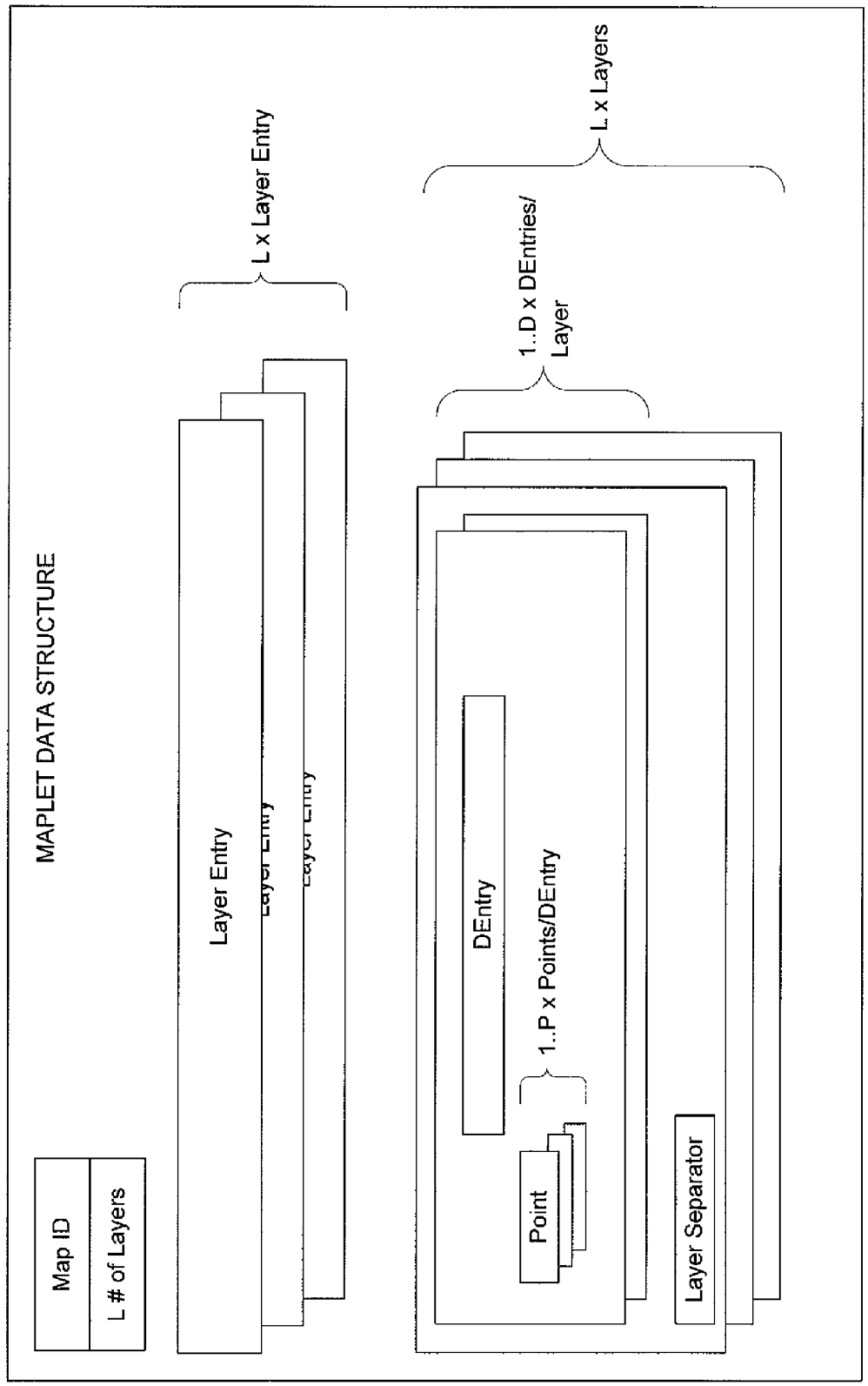
FIG. 3C is a diagram showing a preferred Maplet data structure.

FIG. 3C and Table D (below), in combination, illustrate, by way of example only, a basic Maplet data structure. Generally, as noted above, the Maplet data structure can be said to include a Maplet Index (i.e. an index of the DEntries, each of which is representative of either an artifact or a label or both) together with data Points for each DEntry that actually form such artifacts and labels. In this example, each Maplet includes a Map ID (e.g. 0xA1B1C1D1), the # of Layers in the Maplet, and a Layer Entry for each Layer. The Map ID identifies the data as a valid Maplet, and according to one alternative, may also be used to identify a version number for the data. The # of Layers is an integer which indicates the number of Layers (and therefore Layer Entries) in the Maplet. Each Layer Entry defines rendering attributes and is followed by a list of DEntries for each Layer. The above forms a Maplet Index. For a complete Maplet, each DEntry contains a set of data Points (referred to herein as oPoints) or Labels). It will be noted that Layers can have multiple DEntries and the complete list of DEntries and Points are grouped by Layer and separated by a Layer Separator (e.g. hex value 0XEEEEEEEE). In this example, each Layer Entry is 20 bytes long, and a DEntry is 12 bytes long. However, the number of Layers, number of DEntries per Layer and the number of Points per DEntry depends on the map data and is generally variable.

Table D provides a high "byte-level" description of a Maplet for this example.

TABLE D

| Data | | Quantity | Total # of Bytes |
|---|---|---|---|
| Map ID | | 1 | 4 bytes |
| # of Layers | | 1 | 4 bytes |
| Layer Entries | | # of Layers | 20 bytes × (# of Layers) |
| DEntry of a Layer | x (# of DEntries in a Layer) | # of Layers | 12 bytes × (Σ of the # of DEntries in each Layer) + |
| Points for DEntry of a | | | 4 bytes × (Σ of the # of Points in each DEntry in each Layer) + |
| Layers | | | 4 bytes × (# of Layers) |
| Layer Separator | | | |

Figure 4:
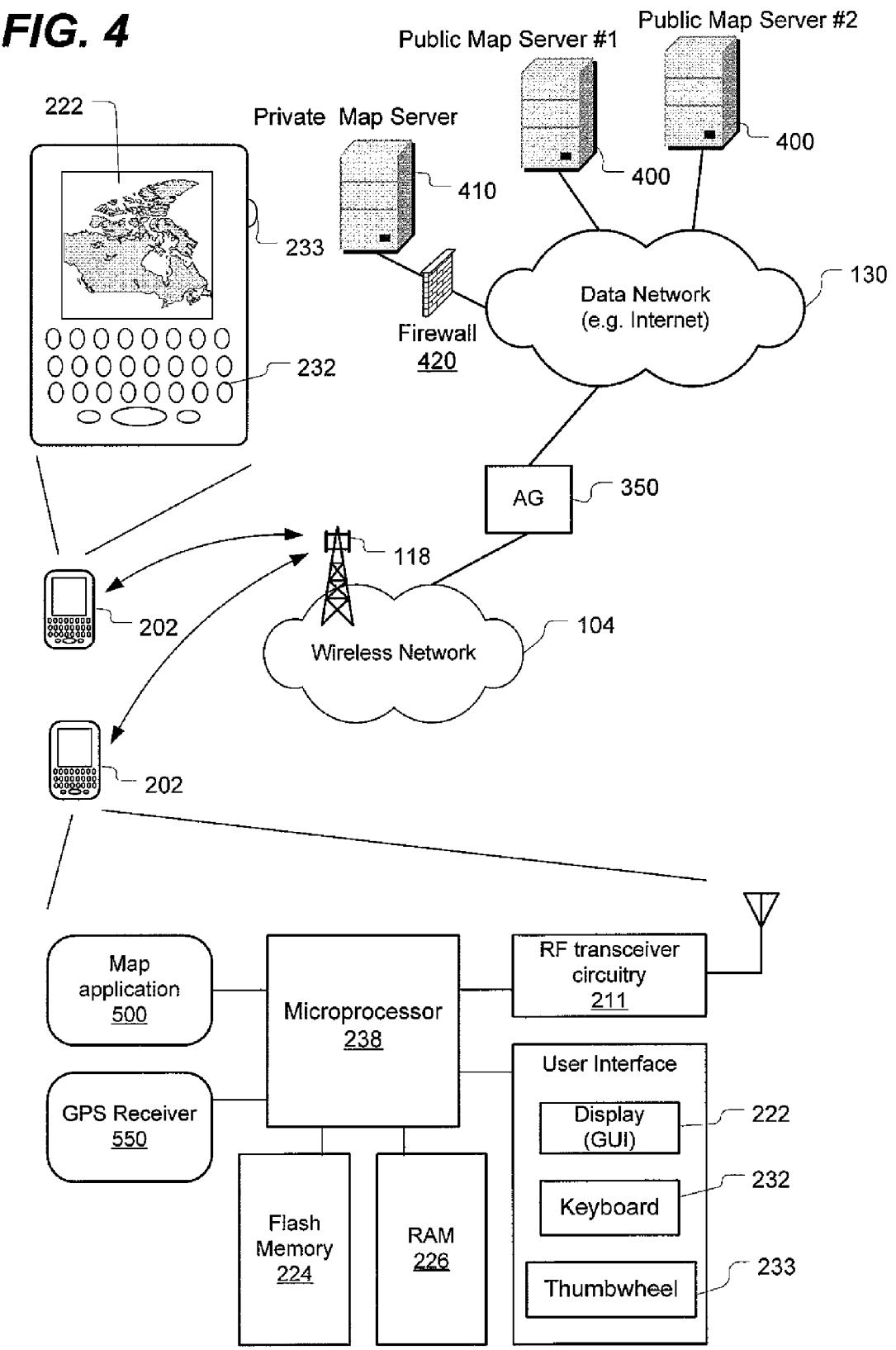
FIG. 4 is a schematic depiction of a wireless network having an applications gateway for optimizing the downloading of map data from map servers to wireless communications devices.

By way of a further example, the wireless network 200 depicted in FIG. 4 can include an applications gateway (AG) 350 for optimizing data flow for onboard applications such as a mapping application 500 stored in memory (e.g. stored in a flash memory 224) and executable by the microprocessor 238 of the wireless device 202.

As shown in FIG. 4, the wireless network 200 hosts a plurality of handheld wireless communications devices 202 (such as the BlackBerry™ by Research in Motion Limited) having voice and data capabilities (for both e-mail and web browsing) as well as a full QWERTY keyboard. These wireless communications devices 202 can access Web-based map data on public map servers 400 hosted on the Internet or other data network 130 via the applications gateway (AG) 350 which mediates and optimizes data flow between the wireless network 200 and the data network by performing various mappings, compressions and optimizations on the data.

The map server extracts generic map content from a Geographical Information Systems (GIS) map database (e.g. Navtech®, TelAtlas®, etc.) at a specified level of resolution (zoom level). Custom graphics associated with the query, such as highlighted route, pushpin for current position or street address, etc. are post-processed and merged by the server with the generic map content. Relevant screen graphics are then labelled, and the merged map graphic is compressed and delivered to the device for display.

In operation, a user of the wireless communications device 202 uses an input device such as keyboard 232 and/or thumbwheel/trackball 233 to cause the microprocessor 238 to open the map application 500 stored in the memory 224. Using the keyboard 232 and thumbwheel/trackball 233, the user specifies a map location on the map application 500. In response to this request/command, the microprocessor 238 instructs the RF transceiver circuitry 211 to transmit the request over the air through the wireless network 104. The request is processed by the AG 350 and forwarded into the data network (Internet) using standard packet-forwarding protocols to one or more of the public and/or private map servers 400, 410. Accessing a private map server 410 behind a corporate firewall 420 was described above with reference to FIG. 3A. These servers provide map data that includes label data for rendering labels or symbols associated with map features, such as roads, streets, cities, rivers, etc. These labels can be stored as DEntries.

For the purposes of this specification, "label" includes not only all conventional forms of labels, such as city names, street names, etc, but also any symbols or icons, such as highway number icons, or symbols or icons used to denote airports, tourist information kiosks, campgrounds, ferry crossings, etc. on large scale (regional) maps or restaurants, hotels, bus stations, etc. on city maps.

Map data downloaded from these one or more map servers 400, 410 is then forwarded in data packets through the data network and mapped/optimized by the AG 350 for wireless transmission through the wireless network 104 to the wireless communications device 202 that originally sent the request. The downloaded map data can be cached locally in RAM 226, and displayed on the display 222 or graphical user interface (GUI) of the device after label positions have been optimized by the map application 500, by employing, for example, a collision-avoidance array representative of the map to be rendered. As will be described below in greater detail, this entails checking whether successive labels of decreasing priority can be rendered on-screen without colliding with higher-priority labels whose map positions have been previously designated.

If a further request is made by the user (or if the user wants a change in the field of view by zooming or panning), the device will check whether the data required can be obtained from the local cache (RAM 226). If not, the device issues a new request to the one or more map servers 400, 410 in the same manner as described above.

As described earlier, map data can optionally be downloaded first as a Maplet Index enabling the user to then choose which DEntries listed in the Index to download in full. Furthermore, as described earlier, the map application can include user-configurable context filtering that enables the user to filter out unwanted map features or artifacts by not downloading specific DEntries corresponding to those unwanted map features or artifacts.

As a variant, the wireless communications device can optionally include a Global Positioning System (GPS) receiver ("GPS chip") 550 for providing location-based services (LBS) to the user in addition to map content. Embedding a GPS chip 550 capable of receiving and processing signals from GPS satellites enable the GPS chip to generate latitude and longitude coordinates, thus making the device "location aware". To obtain local-based services, the map application within the wireless communications device sends a request to the map server for information relating to a city, restaurant, street address, route, etc. If the device is "location aware", the request would include the current location of the device.

In lieu of, or in addition to, GPS coordinates, the location of the device can be determined using triangulation of signals from in-range base towers, such as used for Wireless E911. Wireless Enhanced 911 services enable a cell phone or other wireless device to be located geographically using radiolocation techniques such as (i) angle of arrival (AOA) which entails locating the caller at the point where signals from two towers intersect; (ii) time difference of arrival (TDOA), which uses multilateration like GPS, except that the networks determine the time difference and therefore the distance from each tower; and (iii) location signature, which uses "fingerprinting" to store and recall patterns (such as multipath) which mobile phone signals exhibit at different locations in each cell.

Figure 5:
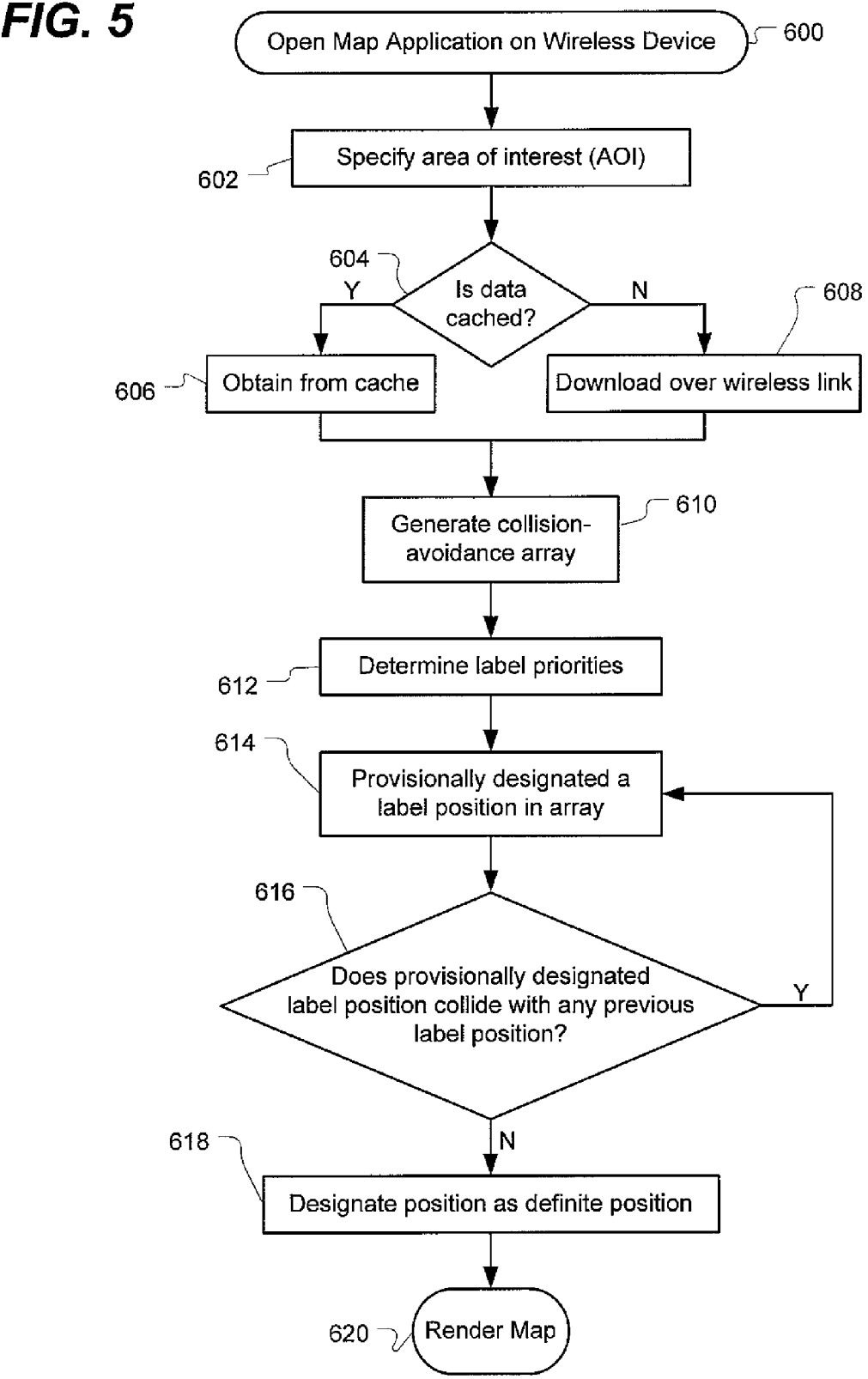
FIG. 5 is a flowchart presenting steps of a method of determining label positions for labels on a map displayed on a wireless device.

Operation of the systems described above will now be described with reference to the method steps depicted in the flowchart of FIG. 5. As depicted in FIG. 5, this method of displaying a map on a wireless communications device includes initial steps of opening the map application on the device (step 600) and specifying an area of interest (AOI) using the map application (step 602), e.g. specifying a street address, coordinates of latitude or longitude, or clicking on a location on a world map, etc. In response to the specifying of an AOI, map data is then obtained (step 604) for rendering the map to be displayed on the wireless communications device. For the purposes of this specification, "obtaining map data" means receiving or downloading the map data over the air, i.e. over a wireless link, retrieving the map data from a local cache, or downloading the map data over a wired connection, or any combination thereof. In other words, as depicted in FIG. 5, obtaining map data includes steps of determining whether the data is already cached locally (step 604). If the data is locally cached, the map data is retrieved from the cache (step 606). Otherwise, if not all of the map data is cached, then the map data is downloaded over the air (step 608).

As depicted in FIG. 5, once the map data is obtained, the device generates a two-dimensional collision-avoidance array or "test array" (step 610) representative of the map or bounding box to be rendered. The collision-avoidance array is generated to enable the device to test, or "virtually render", potential label positions prior to actually rendering the labels on the map. Virtual rendering of labels assigns all label positions in one single pass and thus avoids having to engage in recursive repositioning of labels, which is computationally more intensive, and hence less suitable for small handheld wireless devices.

In one implementation, the collision-avoidance array is scaled such that a single character of a label to be rendered is represented by a single element or pixel in the collision-avoidance array. In other implementations, different granularities could be used such that characters are represented by more than one element of the array.

After the collision-avoidance array is generated, labels are prioritized (step 612). For example, when rendering a street map, highways can be accorded top priority, followed by main boulevards, then mid-sized avenues, followed by side streets. Alternatively, symbols such as airports and hospitals can be given highest priority. Context-filtering can be used to make prioritization a function of the user's preferences and/or the type of map feature for which the user is searching. Prioritization of labels can occur subsequent to the generation of the collision-avoidance array (as depicted in FIG. 5), but it could also occur either prior to the generation of the array or concurrently with the generation of the array. For labels of equal priority (i.e. labels belonging to the same category of importance, such as labels for boulevards of the same size, for example), the prioritization of these labels within the same category of importance could be done randomly, or based on alphabetical order, or from shortest label to longest, etc.

As depicted in FIG. 5, once the array has been generated and the labels have been prioritized, the label positions are assigned by populating the collision-avoidance array by provisionally designating, for each successive label to be rendered, a label space in the collision-avoidance array that corresponds to a map space that is to be occupied by the label on the map (step 614) and by determining (step 616) whether each successive label to be rendered collides in the collision-avoidance array with any previously designated label spaces. If a collision is detected, a new label position is tested by re-designating (provisionally) a new label position in the array (back to step 614). If no collision is detected, the map application 500 designates (step 618) the map position for that particular label as being a definite position (i.e. it is upgraded from provisional to definite). Once all map positions have been determined, the map application renders the labels in positions corresponding to the definitely designated spaces in the collision-avoidance array (step 620). Alternatively, the labels can be rendered one by one as each successive (provisionally designated) map position becomes definite.

FIGS. 6-8 depict the structure and operation of one implementation of the collision-avoidance array, namely where each element or pixel of the array represents a single character of a label to be rendered on the onscreen map. By way of overview, the methodology for populating the array in this implementation can be summarized as follows: (i) for each successive label to be rendered, provisionally designating the label space in the collision-avoidance array such that a midpoint of the corresponding map space aligns with a midpoint of a map feature to which the label relates; (ii) determining whether the provisionally designated label space collides with any previously designated label spaces in the collision-avoidance array; (iii) if the provisionally designated label space does not collide with any previously designated label spaces in the collision-avoidance array, then definitively designating the label space for rendering the label at the corresponding map space on the map; and (iv) if the provisionally designated label space collides with any previously designated label spaces in the collision-avoidance array, then testing a new label space by repositioning the label space either beyond a collision point for cases where less than half of the label space fits before the collision point or before the collision point for cases where more than half of the label space fits before the collision point.

FIG. 6A depicts a map rendered on a display where two labels overlap as a result of being so positioned by a very simplistic algorithm that blindly positions labels at midpoints of their associated features. This illustrates the need to check for potential label collisions before rendering the labels on the map. In prior-art implementations, multiple passes (recursive algorithms) accomplish this task, albeit in a computationally intensive manner that is not suitable for wireless communications devices given their limited onboard processing capacity. Accordingly, a collision-avoidance array 700 having a plurality of elements or pixels 710 is generated for testing provisionally designated positions to ensure that no collision occurs with any previously designated map positions. The array is thus populated by provisionally (tentatively) designating (i.e. "virtually rendering") label positions in the array. For computational efficiency, each label character is represented in the array by a single pixel or element. To begin the process, the highest priority label is "virtually rendered" in its optimal location, usually centered with respect to the associated map feature or midway along its respective path. In the example presented in FIG. 6A, let us assume that the "Highway 1" label is the highest priority label. In that case, the collision-avoidance array of FIG. 6B is populated by blocking off seven vertical elements representing "Highway" and also blocking off an eighth element representing the "1", as shown. In a variant of this implementation, any spaces between the words or symbols constituting a given label would also be blocked off (which is similar to the map space concept discussed below with reference to FIG. 9A and FIG. 9B).

FIG. 6C is a schematic depiction of the collision-avoidance array of FIG. 6B, illustrating the checking of provisionally designated map positions for each successive map label of decreasing priority. In this example, let us assume that the airport symbol is the second-highest priority label, followed by the "First Avenue", "Bank Street" and "Access Road" labels (therefore being the third, fourth and fifth priorities) in terms of labelling. The symbol can be represented by the map space it would occupy (as will be discussed below with reference to FIG. 9A and FIG. 9B).

The label position of the "First Avenue" label is provisionally designated midway along the path. No collision results so the provisional designation of that label position can be upgraded to a definite designation. Similarly, the label position of the "Bank Street" label is provisionally designated midway along its path. No collision results so the provisional designation of that label position can become definite.

However, as shown in FIG. 6C, when the "Access Road" label position is provisionally designated midway along its path, a collision occurs, forcing relocation of the label to a new label position (which, when rendered, would result in the map of FIG. 7A). Since less than half of the label was drawn before the collision occurred, the label is relocated to a label position to the right of (i.e. "beyond") the collision point. If more than half of the label could have been drawn, then the label would have been repositioned to the left of the collision point. As shown in FIG. 7B, a new position for the label is provisionally designated for a second time and this provisional position is checked for collisions. Again, a collision occurs (this time with the Bank Street label). The Access Road label is then repositioned now to the left of both collisions as shown in FIGS. 8A and 8B. As shown in the collision-avoidance array of FIG. 8B, the new provisional designation of the "Access Road" label does not collide with any of the previously designated labels.

In this implementation, elements of the array for which a map position has been definitively designated are "blocked off". Collision points are also stored and flagged, for the purposes of deciding how best to relocate labels whose provisional positions turn out to collide with previously (higher priority labels).

Figures 9A, 9B:
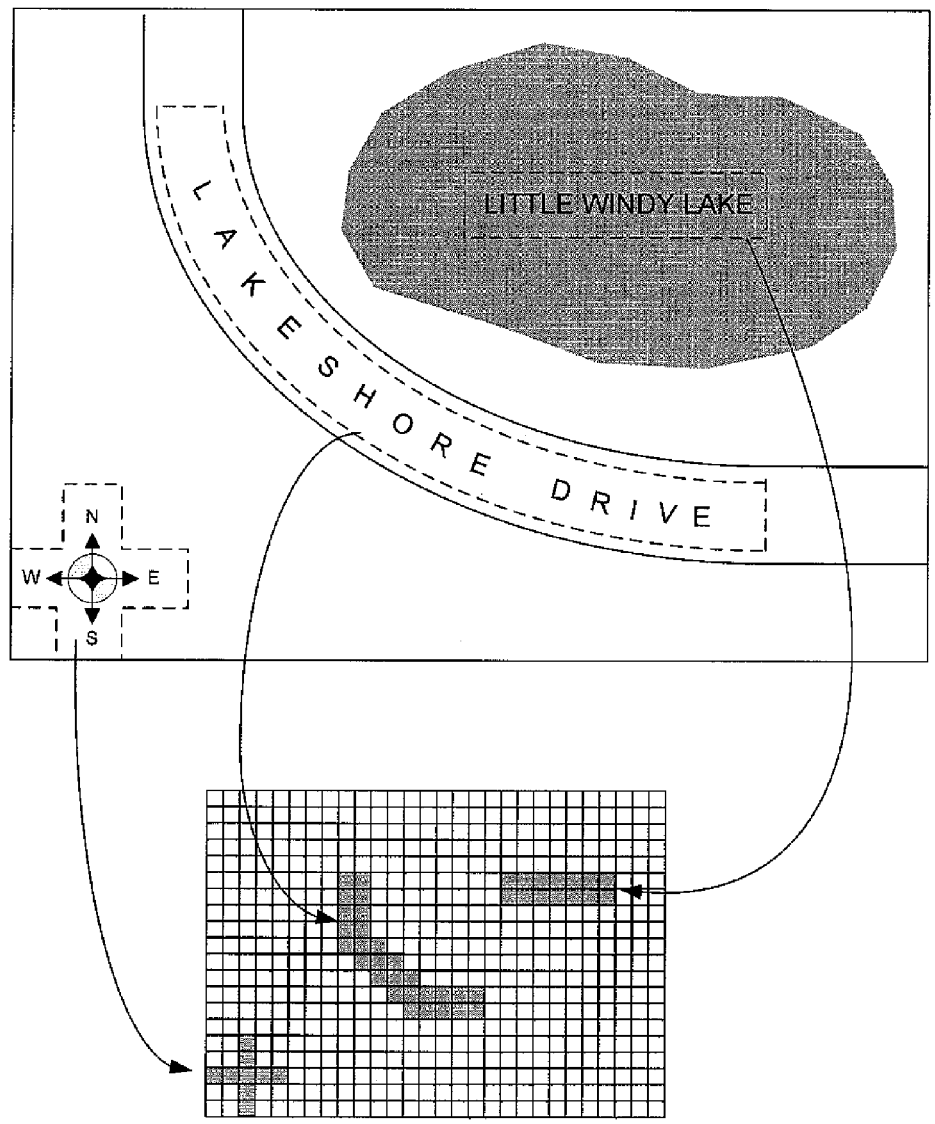
FIG. 9A is a depiction of another implementation of the collision-avoidance array where map spaces are represented by a contiguous set of elements in the array.
FIG. 9B is a schematic depiction of the collision-avoidance array used to test the map position of FIG. 9A.
Figure 10:
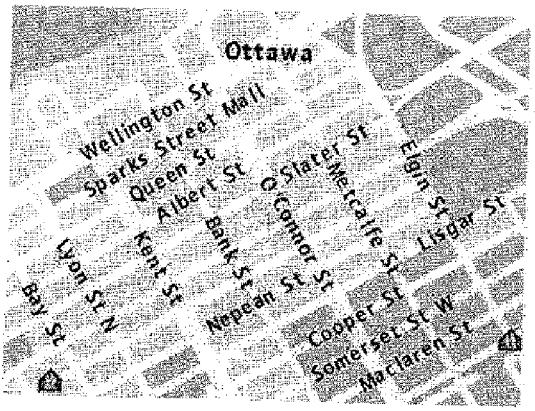
FIGS. 10-21 are successive screenshots of a street map of downtown Ottawa, Canada, showing how the map labels and symbols avoid each other (using the collision-avoidance array) and are dynamically repositioned as the user pans south and east.
Figure 11:
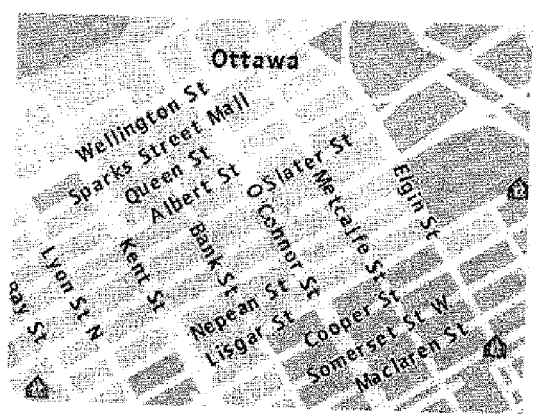
Figure 12:
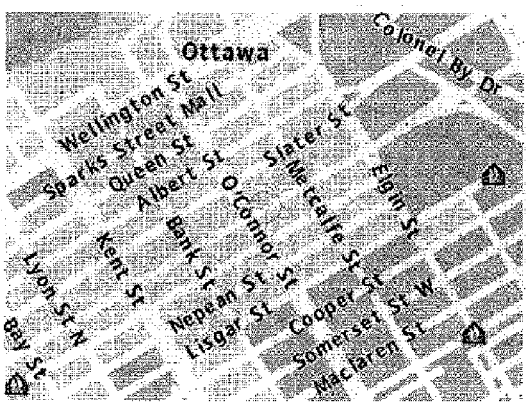
Figure 13:
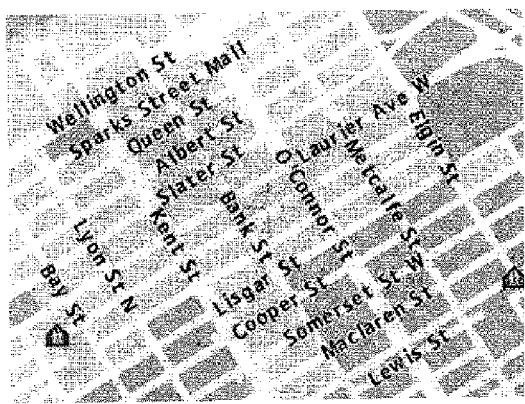
Figure 14:
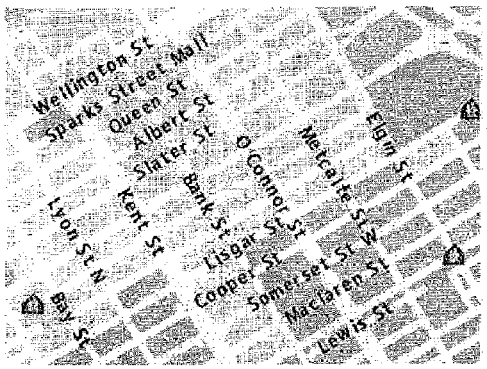
Figure 15:
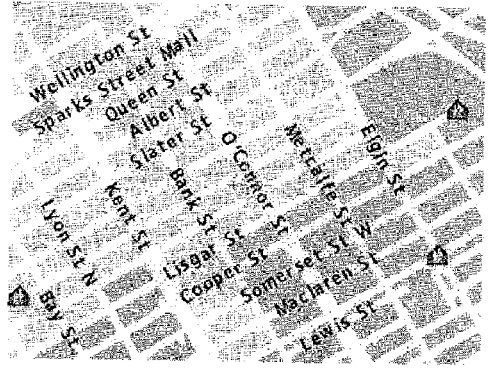
Figure 16:
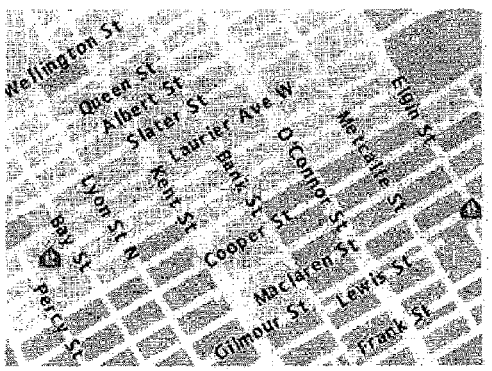
Figure 17:
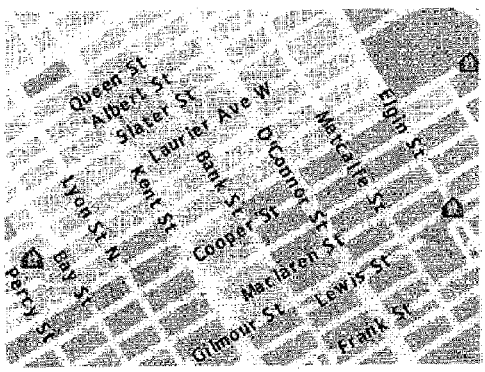
Figure 18:
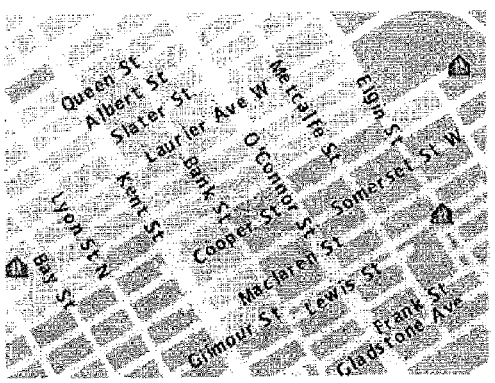
Figure 19:
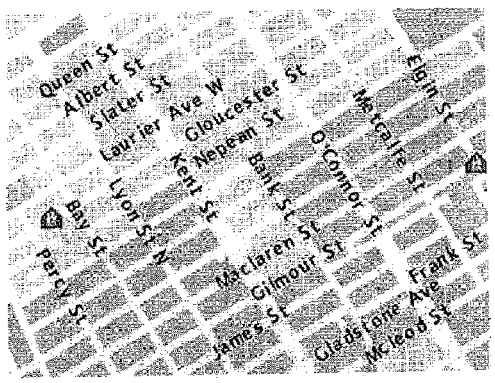
Figure 20:
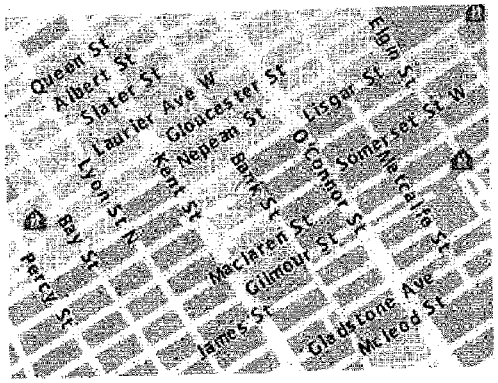
Figure 21:
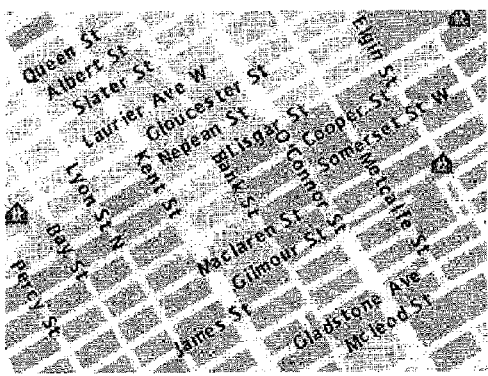

FIG. 9A and FIG. 9B depict another implementation of the collision-avoidance array where the collision-avoidance array is defined such that each map space to be occupied by each label when rendered on the map is represented by a corresponding, contiguous set of elements in the array. In other words, instead of representing each character by a single element or pixel of the array, the amount of map space that the label is to occupy (which is shown as dashed lines in FIG. 9A around each label and symbol) is represented in the collision-avoidance array (see FIG. 9B) as a set of contiguous elements or pixels. In certain instances, this approach, i.e. approximating a label space with a set of array elements rather than representing each character by its own element, yields superior results, especially where a label is composed of two or more discrete words (such as "Lakeshore Drive" or "Little Windy Lake") because a space between adjacent words of the same label is not treated as an available (free) location for another label.

FIGS. 10-21 are successive screenshots of a street map of downtown Ottawa, Canada, showing how the map labels and symbols avoid each other (using the collision-avoidance array) and are dynamically repositioned as the user pans south and east. In these screenshots, it should be noted that symbols are rendered before labels because the former are associated with a fixed location (e.g. a school) whereas the latter (being text-on-path) can be repositioned to any position along its associated path. As illustrated, the use of a collision-avoidance array enables smooth and efficient repositioning of map labels as the user repeatedly pans south and east, thus requiring the device to render the labels for each change in the field of view. The simplicity and efficiency of the present method makes this possible.

Figure 22:
FIG. 22 is a screenshot of a regional map showing Ottawa, Canada and its surrounding municipalities, rivers and highways wherein text-on-path labels are dynamically repositioned to avoid other labels but wherein any label having a single, fixed location is simply not rendered if it collides with the label of a previously designated map position.

FIG. 22 is a screenshot of a regional map showing Ottawa, Canada and its surrounding municipalities, rivers and highways wherein text-on-path labels are dynamically repositioned to avoid other labels but wherein any label having a single, fixed location is simply not rendered if it collides with the label of a previously designated map position. In this example, high-priority city names are rendered first (e.g. "Ottawa") as these are non-movable. Towns of lesser importance may not be rendered if their labels collide with any label of higher priority as these are also non-movable labels. Preferably, highway labels, which can move along their respective paths, are rendered after the fixed-place labels are positioned.

The foregoing method steps can be implemented as coded instructions in a computer program product. In other words, the computer program product is a computer-readable medium upon which software code is recorded to perform the foregoing steps when the computer program product is loaded into memory and executed on the microprocessor of the wireless communications device.

This new technology has been described in terms of specific implementations and configurations which are intended to be exemplary only. The scope of the exclusive right sought by the Applicant is therefore intended to be limited solely by the appended claims.

The invention claimed is:

1. A method of displaying a map on a wireless communications device, the method comprising:
   obtaining map data for rendering the map to be displayed on the wireless communications device by downloading the map data over a wireless link, the map data including label data for rendering labels on the map, wherein the labels comprise at least one symbol or icon;
   generating a collision-avoidance array representative of the map to be rendered for testing potential label positions prior to actually rendering the labels on the map;
   populating the collision-avoidance array by provisionally designating, for each successive label to be rendered, a label space in the collision-avoidance array that corresponds to a map space that is to be occupied by the label on the map and by determining whether each successive label to be rendered collides in the collision-avoidance array with any previously designated label spaces; and
   rendering the labels on the map in the map spaces corresponding to the label spaces designated in the collision-avoidance array;
   wherein populating the collision-avoidance array comprises:
   for each successive label to be rendered, provisionally designating the label space in the collision-avoidance array such that a midpoint of the corresponding map space aligns with a midpoint of a map feature to which the label relates;
   determining whether the provisionally designated label space collides with any previously designated label spaces in the collision-avoidance array;
   if the provisionally designated label space does not collide with any previously designated label spaces in the collision-avoidance array, then definitively designating the label space for rendering the label at the corresponding map space on the map; and
   if the provisionally designated label space collides with any previously designated label spaces in the collision-avoidance array, then testing a new label space by repositioning the label space either beyond a collision point for cases where less than half of the label space fits before the collision point or before the collision point for cases where more than half of the label space fits before the collision point.

2. The method as claimed in claim 1 wherein populating the collision-avoidance array further comprises prioritizing the labels such that the collision-avoidance array is populated by provisionally designating label spaces for labels of highest priority to lowest priority.

3. A computer readable medium comprising code to perform the method of claim 1 when the computer readable medium is loaded into memory and executed on a processor of a wireless communications device.

4. A computer readable medium comprising code to perform the method of claim 2 when the computer readable medium is loaded into memory and executed on a processor of a wireless communications device.

5. A wireless communications device for enabling a user of the device to display a map on the device, the wireless device comprising:
   an input device for enabling the user to cause the device to obtain map data for rendering the map to be displayed on a display of the device by downloading the map data over a wireless link, the map data including label data for rendering labels on the map for identifying one or more map features, wherein the labels comprise at least one symbol or icon; and
   a memory for storing code to instruct a processor to:
   generate a collision-avoidance array representative of the map to be rendered for testing potential label positions prior to actually rendering the labels on the map;
   populate the collision-avoidance array by provisionally designating, for each successive label to be rendered, a label space in the collision-avoidance array that corresponds to a map space that is to be occupied by the label on the map and by determining whether each successive label to be rendered collides in the collision-avoidance array with any previously designated label spaces; and
   render the labels on the map in the map spaces corresponding to the label spaces designated in the collision-avoidance array;
   wherein the processor populates the collision-avoidance array by:
   for each successive label to be rendered, provisionally designating the label space in the collision-avoidance array such that a midpoint of the corresponding map space aligns with a midpoint of a map feature to which the label relates;
   determining whether the provisionally designated label space collides with any previously designated label spaces in the collision-avoidance array;
   if the provisionally designated label space does not collide with any previously designated label spaces in the collision-avoidance array, then definitively designating the label space for rendering the label at the corresponding map space on the map; and
   if the provisionally designated label space collides with any previously designated label spaces in the collision-avoidance array, then testing a new label space by repositioning the label space either beyond a collision point for cases where less than half of the label space fits before the collision point or before the collision point for cases where more than half of the label space fits before the collision point.

6. The wireless communications device as claimed in claim 5 wherein the processor populates the collision-avoidance array by prioritizing the labels such that the collision-avoidance array is populated by provisionally designating label spaces for labels of highest priority to lowest priority.

7. The method as claimed in claim 1 wherein the generating of the collision-avoidance array occurs prior to prioritizing the labels.

8. The computer readable medium as claimed in claim 3 wherein the generating of the collision-avoidance array occurs prior to prioritizing the labels.

9. The wireless communications device as claimed in claim 5 wherein the processor generates the collision-avoidance array before prioritizing the labels.

* * * * *